United States Patent
Waide

(10) Patent No.: US 8,497,779 B1
(45) Date of Patent: Jul. 30, 2013

(54) ENSURING POWER SOURCE REDUNDANCY

(75) Inventor: Ronan C. Waide, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 363 days.

(21) Appl. No.: 12/940,470

(22) Filed: Nov. 5, 2010

(51) Int. Cl.
*G08B 21/00* (2006.01)

(52) U.S. Cl.
USPC ........................................ 340/636.1

(58) Field of Classification Search
USPC   340/636.1, 508, 13.23, 815.4, 384.1; 307/18, 307/23; 713/300, 340
See application file for complete search history.

(56) References Cited

U.S. PATENT DOCUMENTS

| | | | |
|---|---|---|---|
| 4,097,843 A * | 6/1978 | Basile ........................... | 340/656 |
| 5,245,633 A | 9/1993 | Schwartz et al. | |
| 6,300,881 B1 | 10/2001 | Yee et al. | |
| 6,331,814 B1 | 12/2001 | Albano et al. | |
| 7,453,352 B2 | 11/2008 | Kline | |
| 7,698,595 B2 * | 4/2010 | Inoue et al. ...................... | 714/14 |
| 2004/0177283 A1 * | 9/2004 | Madany et al. ................ | 713/300 |
| 2004/0199342 A1 * | 10/2004 | Graves et al. ................... | 702/60 |
| 2006/0077891 A1 * | 4/2006 | Smith et al. .................... | 370/220 |

* cited by examiner

*Primary Examiner* — Phung Nguyen
(74) *Attorney, Agent, or Firm* — Thomas | Horstemeyer, LLP

(57) ABSTRACT

Disclosed are various embodiments that are employed to ensure power source redundancy for a computing device. A plurality of power inputs of a computing device are coupled to at least one of a plurality of power sources. A determination is made as to whether at least two identifiers embodied in a corresponding at least two data signals transmitted over at least two power lines are the same. Each of the power lines is coupled to a respective one of the power inputs, and the data signals are transmitted by at least one of the power sources.

24 Claims, 7 Drawing Sheets

ENSURING POWER SOURCE REDUNDANCY

BACKGROUND

In large scale computing centers, it is possible that thousands of servers may be running at a single time. Many servers may include multiple power inputs coupled to multiple separate power sources to provide for power input redundancy. This ensures that if one of the power sources goes down, the servers coupled thereto would continue to operate given that they are still powered by other power sources. However, it can be the case that those who install servers may couple the same power source to both power inlets of a given server.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

According to various embodiments, various systems and methods are employed to ensure power redundancy for computing devices. Specifically, various computing devices such as those in server banks and the like each include two or more power inputs. Ideally, separate power sources should be attached to each of these power inputs so that if one or more power sources go down, any remaining power sources can still supply power to the computing device. Various approaches are described herein to ensure that the same power supply is not inadvertently coupled to two or more power inputs of a computing device. In the following discussion, a general description of the system and its components is provided, followed by a discussion of the operation of the same.

Figure 1:
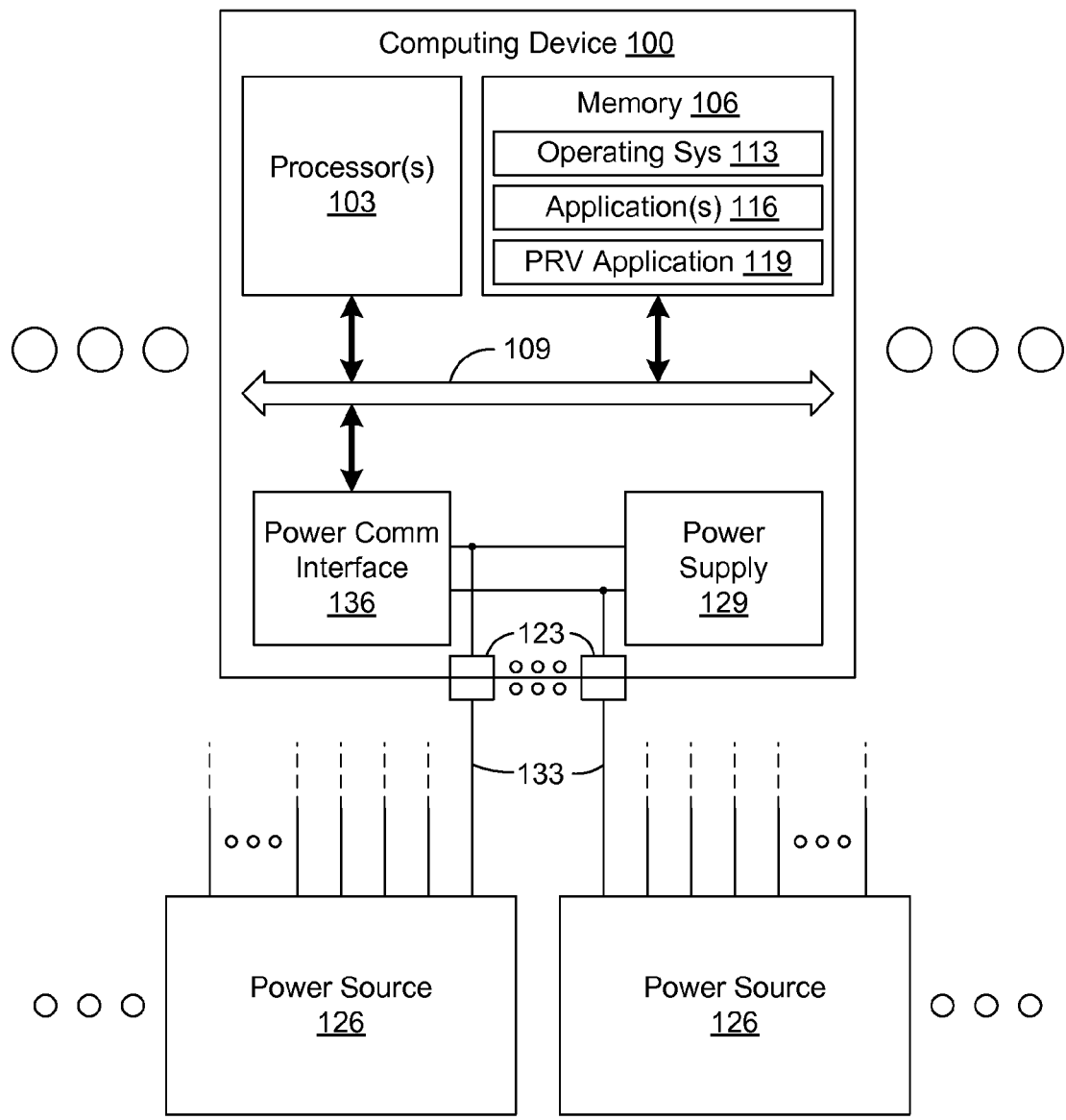
FIG. 1 is a drawing of one example of a computing device with multiple power inputs according to various embodiments of the present disclosure.

With reference to FIG. 1, shown is a computing device 100 according to various embodiments. The computing device 100 may comprise, for example, a server computer or any other system providing computing capability. According to various embodiments, a plurality of computing devices 100 may be employed that are arranged, for example, in one or more server banks or computer banks or other arrangements. For example, a plurality of computing devices 100 together may comprise a cloud computing resource, a grid computing resource, and/or any other distributed computing arrangement. Such computing devices 100 may be located in a single installation or may be distributed among many different geographical locations. For purposes of convenience, the computing device 100 is referred to herein in the singular. Even though the computing device is referred to in the singular, it is understood that a plurality of computing devices 100 may be employed in the various arrangements, as described above.

The computing device 100 includes at least one processor circuit, for example, having a processor 103 and a memory 106, both of which are coupled to a local interface 109. To this end, the computing device 100 may comprise, for example, at least one server computer or like device. The local interface 109 may comprise, for example, a data bus with an accompanying address/control bus or other bus structure as can be appreciated.

Stored in the memory 106 are both data and several components that are executable by the processor 103. In particular, stored in the memory 106 and executable by the processor 103 are an operating system 113, various applications 116, power redundancy verification application 119, and potentially other applications. The applications 116 generally comprise primary applications run on the computing device 100 to accomplish various purposes. Also stored in the memory 106 may be a data store and other data.

The computing device 100 includes two or more power inputs 123 that receive power from power sources 126 that is provided to a power supply 129 or other appropriate circuit connection in the computing device 100 to provide power to the computing device. For purposes of illustration, the Figures herein show various embodiments of the computing device 100 and other such devices having two power inputs 123. However, where two power inputs 123 to a respective device are shown and discussed herein, the recitation of two power inputs 123 as such is merely representative of the fact that more than two power inputs 123 may be employed. Accordingly, in any embodiment described herein, two or more power inputs 123 may be used, where any power input 123 in addition to two provides greater power source redundancy as can be appreciated.

The power generated by the power sources 126 may comprise either alternating current (AC) power or direct current (DC) power. Where the power sources 126 supply AC power, the power supply 129 may include a rectifier. In the case that the power sources 126 supply DC power, the power supply 129 may be omitted, where the power inputs 123 are coupled to some other point in the computing device 100. Each of the power sources 126 are configured to supply power to multiple computing devices 100 as shown. Alternatively, in the various embodiments described herein, the single power supply 129 may be viewed as representing multiple parallel power supplies that each couple to one of the power inputs 123.

Each of the power inputs 123 may comprise, for example, a receptacle into which a power line 133 such as a power cord is plugged. Alternatively, the power cord 133 may be hard wired to the power supply 129 or other circuitry in the computing device 100.

The computing device 100 includes a power communication interface 136 that is coupled to both the power inputs 123 and to the local interface 109. In one embodiment, the power communication interface 136 is configured to receive data signals transmitted by the respective power sources 126 on the power lines 133. In this respect, such data signals are transmitted on top of the power signal itself using frequency modulation or other appropriate techniques. Also, various filtering techniques may be employed. In another embodiment, the power communication interface 136 is configured to transmit a data signal through a first one of the power inputs 123 and receive data signals through a second one of the power inputs 123. Alternatively, the power communication interface 136 may transmit and receive through both power inputs 123.

Figure 2:
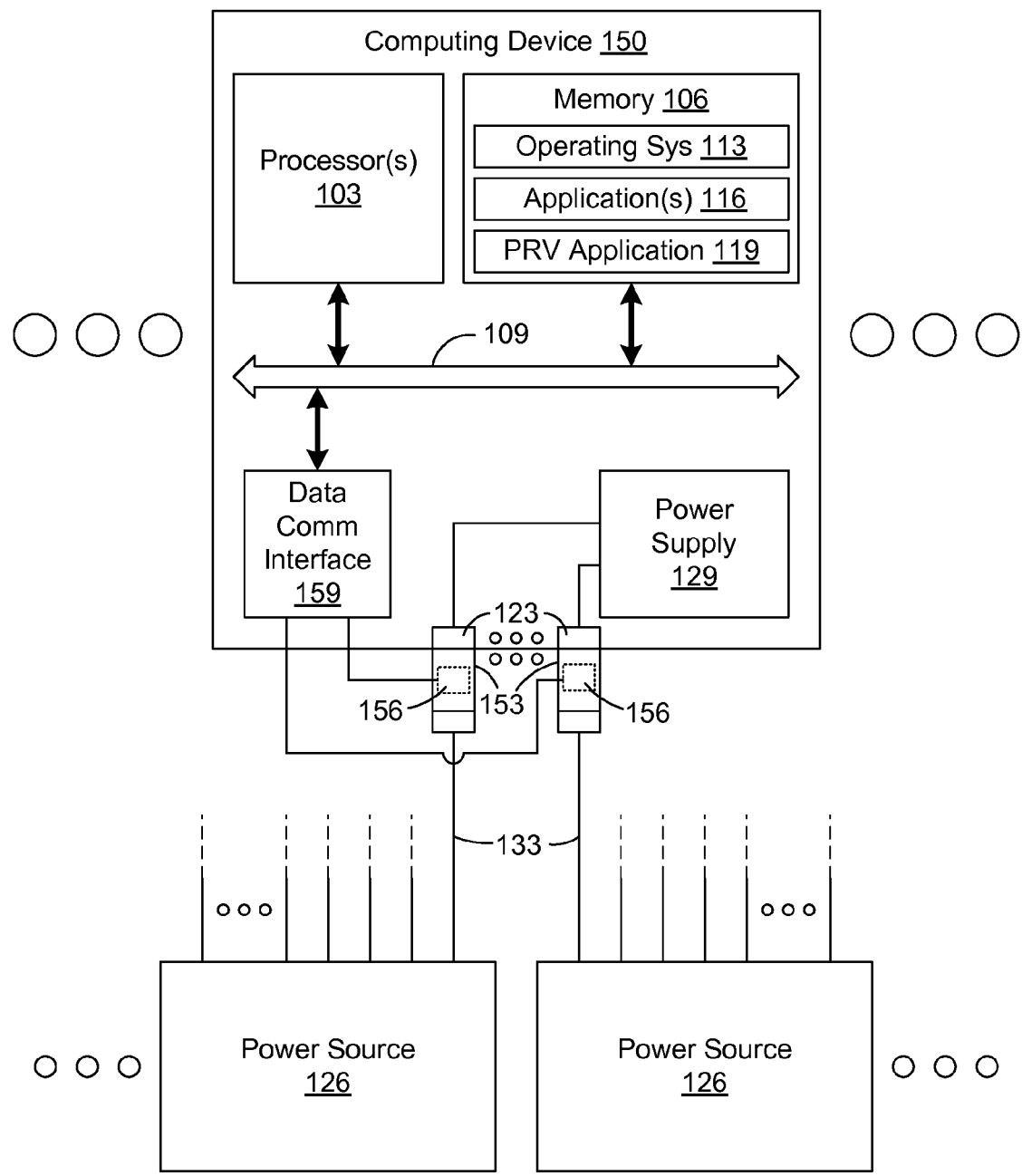
FIG. 2 is a drawing of another example of a computing device with multiple power inputs according to various embodiments of the present disclosure.

With reference to FIG. 2, shown is another example of the computing device 150 that is similar to the computing device 100 (FIG. 1) with a few changes. Specifically, the power sources 126 are coupled to the power inputs 123 through adaptors 153. Each adaptor includes a data communication circuit 156 that performs various tasks that were previously performed by the power communication interface 136 (FIG. 1). In this sense, the functionality that facilitates receiving data signals transmitted over the power lines 133 may be located in the power communication interface 136 or within the data communication circuits 156 in the adaptors 153. The computing device 150 further includes a data communication interface 159 that facilitates data communication between the computing device 150 and the data communication circuits 156 within the adaptors 153.

According to various embodiments, the power redundancy verification application 119 is configured to determine if both of the power inputs 123 are coupled to the same power source 126. In order to make this determination, according to one embodiment each power source 126 is configured to transmit a data signal that includes a power source identifier onto the power lines 133 and into the power inputs 123. The data signal may be transmitted at a frequency that is frequency modulated with respect to the power signal that is applied to the power inputs 123.

If the same power source 126 is coupled to both power inputs 123, then the power redundancy verification application 119 is configured to detect that the same power identifier has been received through both power inputs 123 having been generated by the same power source 126. In such a situation, the power redundancy verification application 119 will trigger an alarm to alert personnel of the problem. For the various embodiments described herein, alarms that may be employed include, for example, an audible alarm (e.g. using a speaker), a visual alarm (e.g. using a light indicator), a messaging alarm (e.g. an email, text message, or other type of message), a flag (e.g. a software variable indicating an alarm condition to a monitoring system), or other type of alarm. Such alarms are provided because it is important to have two or more different power sources 126 coupled to the respective power inputs 123 to provide for power source redundancy. Specifically, if one of the power sources goes down, the other power source can still provide power to maintain the operation of the computing device 150. In the case that the applications 116 implemented in the computing device 150 comprise critical operations, the power source redundancy in this respect ensures that critical data is not lost and operational integrity is maintained.

The power communication interface 136 is configured to receive both the power signals received through the power inputs 123 and applied to a power supply or other circuitry, where the data signals are "piggy backed" upon the power signals by the respective one or more power sources 126 using one of various power data transmission techniques. The power communication interface 136 ultimately obtains the power source identifiers embodied in the data signals received. Upon obtaining the identifiers that are associated with the respective power sources 126, the power communication interface 136 makes such data available on the local interface 109 for the power redundancy verification application 119 so that the determination as to whether a single power source 126 is inadvertently coupled to both power inputs 123 may be made.

It should be noted that the embodiment as described in FIG. 2 includes the data communication circuits 156 in each of the adaptors 153 that are configured to receive the data signals imposed on the power signals transmitted through the power lines 133. In this respect, the adaptors 153 are coupled between the power lines 133 and the power inputs 123 to facilitate ease of installation and to avoid the necessity of including the power communication interface 136 within the computing device 150. In this respect, the adaptors 153 facilitate the use of the existing infrastructure in that the computing device 150 need not be changed to accommodate a power communication interface 136.

The data communication circuits 156 receive the data signals imposed on the power signals from one or more power sources 126 and send the power source identifiers included within such data signals to the computing device 150 through the data communication interface 159. The data communication interface 159 may comprise, for example, a universal serial bus input interface or other appropriate interface to facilitate data communication between the respective data communication circuits 156 and the computing device 150. The data communication interface 159 thus makes the power source identifiers received by the data communication circuits 156 available on the local interface 109 for the power redundancy verification application 119 so that it may make a determination as to whether a single power source 126 is coupled to both power inputs 123 as described above.

Figure 3:
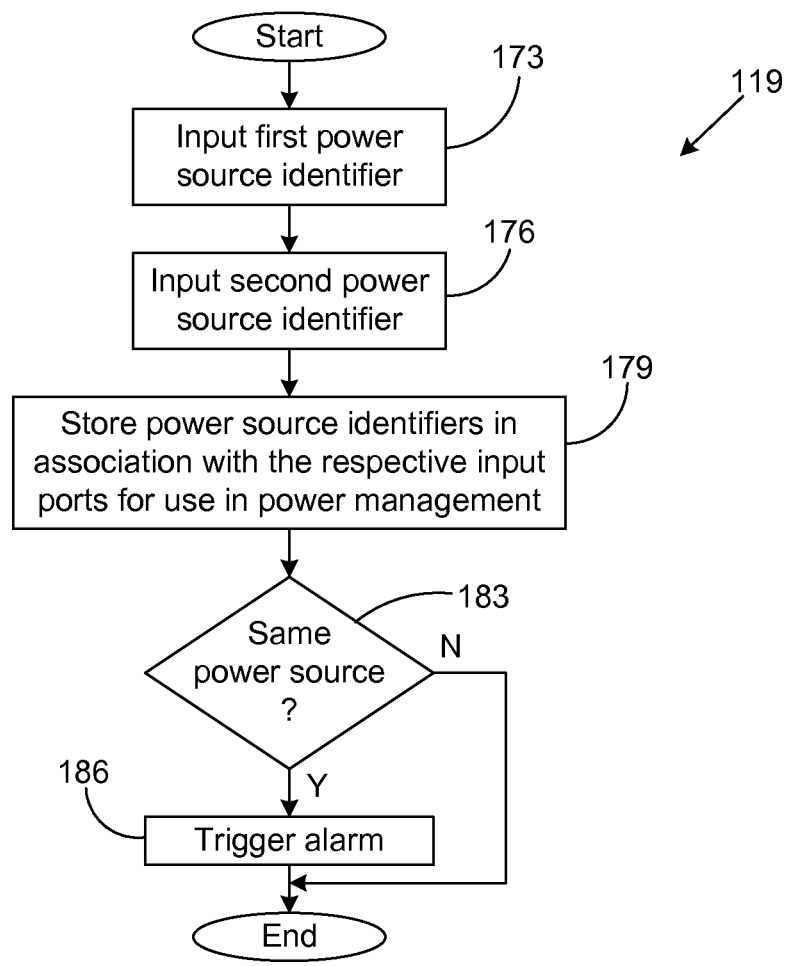
FIG. 3 is a flowchart illustrating one example of functionality of a power redundancy verification implemented in either of the computing devices of FIG. 1 or FIG. 2 according to various embodiments of the present disclosure.

Referring next to FIG. 3, shown is a flowchart that provides one example of the operation of a portion of the power redundancy verification application 119 implemented in either the computing device 100 (FIG. 1) or the computing device 150 (FIG. 2) according to various embodiments. It is understood that the flowchart of FIG. 3 provides merely an example of the many different types of functional arrangements that may be employed to implement the operation of the portion of the power redundancy verification application 119 as described herein. As an alternative, the flowchart of FIG. 3 may be viewed as depicting an example of steps of a method implemented in either the computing device 100 or 150 according to one or more embodiments.

To begin, in box 173, the power redundancy verification application 119 first inputs a power source identifier embodied in the first one of the data signals transmitted over a respective one of the power lines 133 (FIGS. 1, 2) as described above. Thereafter, in box 176, a second power source identifier is obtained in the same manner from a second one of the data signals transmitted over the other one of the power lines 133 as described above. Next, in box 179, the respective power source identifiers are stored in a memory 106 (FIGS. 1, 2) in association with the respective power inputs 123 (FIGS. 1, 2) for use by the power redundancy verification application 119 and potentially for other power management functions.

Next, in box 183, it is determined whether the same power source 126 is coupled to both of the power inputs 123. If the power source identifiers are the same, then the same power source 126 (FIGS. 1, 2) is broadcasting the same power identifier across both power lines 133 that are coupled to both power inputs 123 of the same computing device 100/150. If both power identifiers are the same, as determined in box 183, then the power redundancy verification application 119 proceeds to box 186 to trigger an alarm and/or send a message to appropriate personnel to take action to cause a different power source 126 to be coupled to one of the power inputs 123. Thereafter, power redundancy verification application 119 ends as shown.

Assuming that new power source identifiers are different as determined in box 183, then the power redundancy verification application 119 ends as shown.

The alarm that may be triggered may comprise, for example, an alarm light, an audible alarm, a message sent to various locations via email, simple message system (SMS) format, or some other format, or some other type of alarm as can be appreciated.

Figure 4:
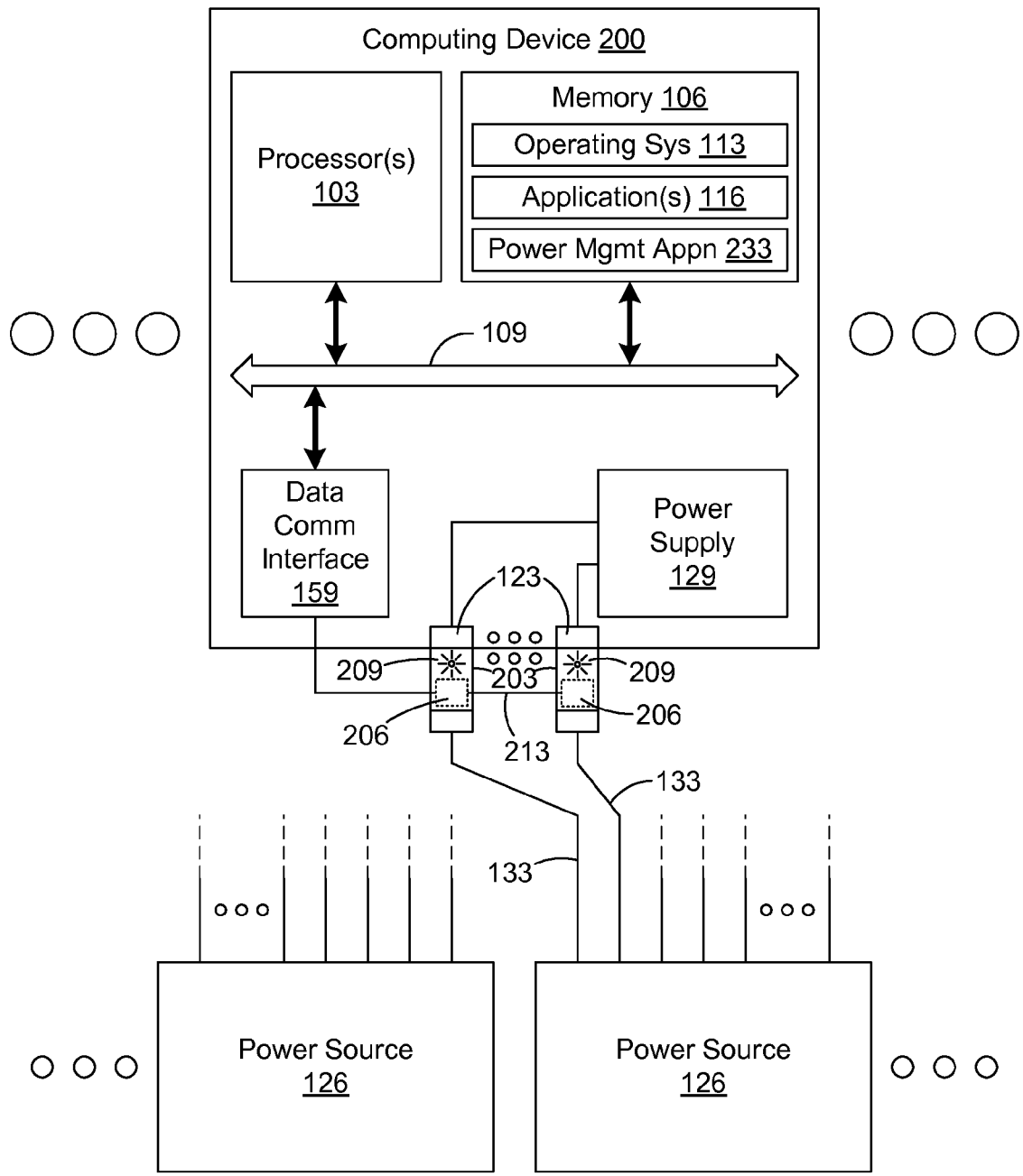
FIG. 4 is a drawing of another example of a computing device with multiple power inputs according to various embodiments of the present disclosure.

With reference to FIG. 4, shown is another example of a computing device 200 that is similar to the computing device 150 (FIG. 2) with a few changes. Specifically, the power sources 126 are coupled to the power inputs 123 of the computing device 200 through adaptors 203. Each adaptor includes a power redundancy verification system 206 that performs various tasks that differ from the data communication circuits 156 (FIG. 2) described previously. In addition, the adaptors 203 include an alarm output 209 that may comprise, for example, an indicator light, a speaker or other audio generator, or other type of alarm. In addition, the power redundancy verification systems 206 each include a data communication port that are coupled to each other by way of data communication line 213. Also, each of the power redundancy verification system 206 further includes a second data communication port that may be coupled to the data communication interface 159, although in one embodiment, only a single one of the multiple power redundancy verification systems 206 are coupled to the data communication interface 159.

In addition, a power management application 233 is implemented on the computing device 200. The power management application 233 receives inputs from the adaptors 203 to track which power sources 126 are coupled to which computing devices 200, assuming that there are many computing devices 200 and power supplies as shown. In this respect, the power management application 233 may receive data communication from other computing devices 200 in order to manage power supply to all of the computing devices 200, where the fact that the power management application 233 is included in the computing device 200 is shown for purposes of illustration.

The adaptors 203 are configured to be self-sufficient as they can make a full determination as to whether a single power source 126 is coupled to both of the power inputs 123. Specifically, each of the adaptors 203 includes a power redundancy verification system 206 that is configured to obtain the power source identifier transmitted by the respective power sources 126 from the power signal transmitted on the power line 133. The power redundancy verification systems 206 are further configured to communicate with each other to determine whether their respective power identifiers are the same. Upon making a determination that the power source identifiers are the same, the power redundancy verification system 206 can trigger an alarm output such as the alarm output 209 that comprises a light, an audible alarm or some other alarm as can be appreciated. Also, a respective one of the power redundancy verification systems 206 may be coupled to a data communication interface 159 to communicate the power source identifiers to a power management application 233 implemented in the computing device 200, or some other device networked therewith, so that power management application 233 may track the power source couplings to respective computing devices 200 as can be appreciated.

Figure 5:
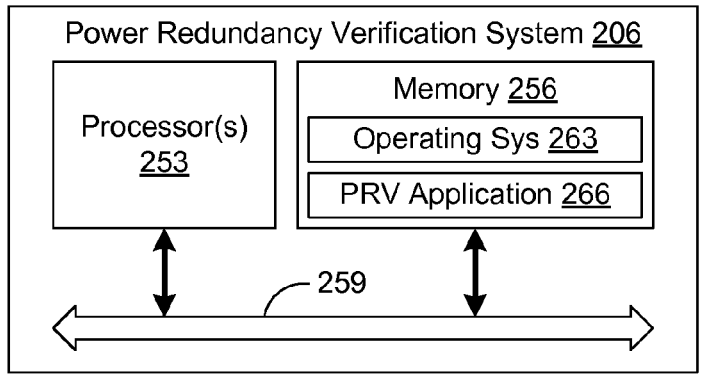
FIG. 5 is a drawing of an example of a power redundancy verification system included, for example, in an adaptor coupled to one of the multiple power inputs of the computing device of FIG. 4 according to various embodiments of the present disclosure.

Referring next to FIG. 5, shown is one example of the power redundancy verification system 206 that includes at least one processor circuit, for example, having a processor 253 and a memory 256, both of which are coupled to a local interface 259. The local interface 259 may comprise, for example, a data bus with an accompanying address/control bus or other bus structure as can be appreciated. Stored in the memory 256 are both data and several components that are executable by the processor 253. In particular, stored in the memory 256 and executable by the processor 253 are an operating system 263, a power redundancy verification application 266, and potentially other applications.

Figure 6:
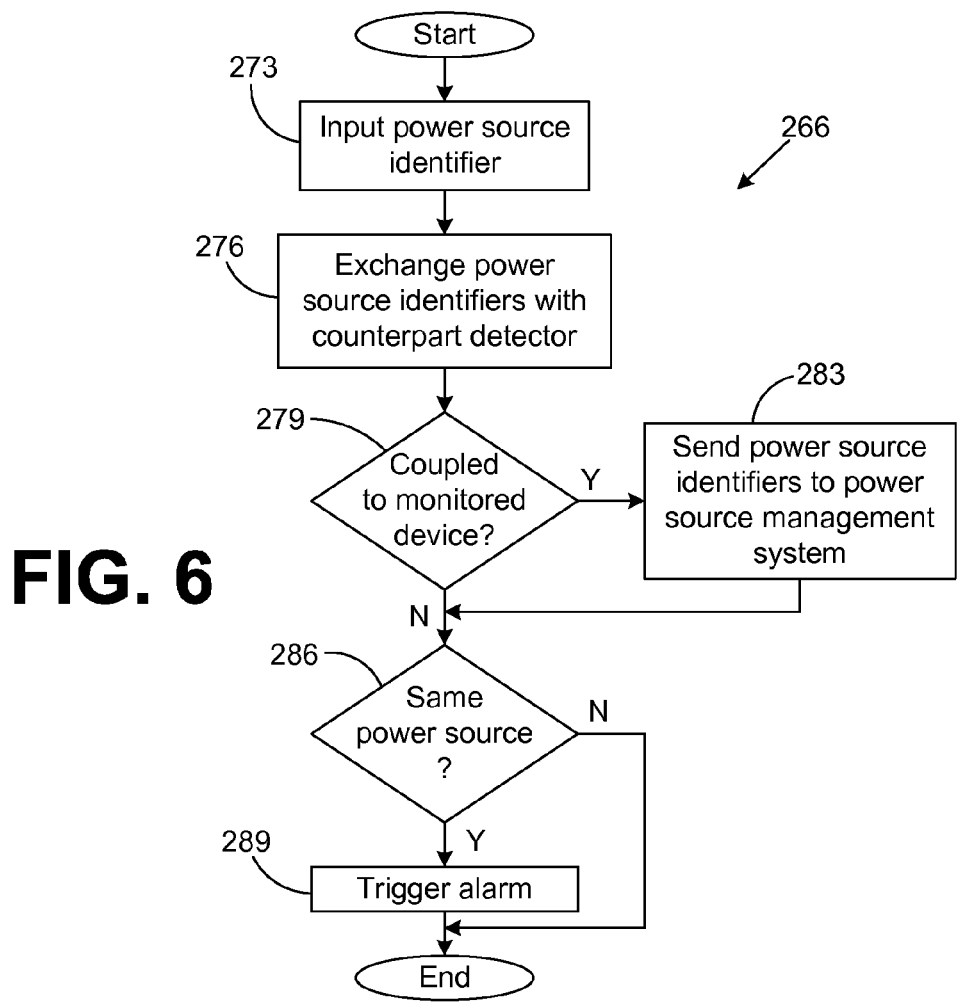
FIG. 6 is a flowchart illustrating one example of functionality of a power redundancy verification application implemented in the system of FIG. 5 according to various embodiments of the present disclosure.

Referring next to FIG. 6, shown is a flowchart that provides one example of the operation of the power redundancy verification application 266 as part of the power redundancy verification system 206 (FIG. 5) according to various embodiments. It is understood that the flowchart of FIG. 6 provides merely an example of the many different types of functional arrangements that may be employed to implement the operation of the portion of the power redundancy verification application 266 as described herein. As an alternative, the flowchart of FIG. 6 may be viewed as depicting an example of steps of a method implemented in the power redundancy verification system 206 according to one or more embodiments.

To begin, in box 273 the power redundancy verification application 266 inputs a power source identifier transmitted from a power source 126 (FIG. 4) and received in the adaptor 203 (FIG. 4) in which the power redundancy verification application 266 is executed. Thereafter in box 276, the power redundancy verification application 266 exchanges power source identifiers with a counterpart power source redundancy verification application 266 in the other adaptor 203 that is coupled to the same computing device 200 (FIG. 4). In doing so, the power redundancy verification application 266 may use a predefined protocol to exchange information as can be appreciated.

Thereafter, in box 279, the power redundancy verification application 266 determines whether it is coupled to a data communication interface 159 as described above. Such a coupling facilitates communication of power source identifier information to the power management application 233 (FIG. 4) as described above. The coupling between the power redundancy verification system 206 (FIG. 5) and the data communication interface 159 (FIG. 4) may comprise, a universal serial bus interface or other appropriate interfaces as can be appreciated.

Assuming that the power redundancy verification application 266 is coupled to the respective data communication interface 159 as mentioned above, then the power redundancy verification application 266 proceeds to box 283 to transmit the power source identifiers to the computing device 200 (FIG. 4) through the data communication interface 159 to provide such information to power management application 233 as described above. Thereafter, the power redundancy verification system 206 proceeds to box 286. Assuming that the power redundancy verification system 206 is not coupled to the data communication interface 159, then the power redundancy verification application 266 proceeds directly to box 286.

In box 286, power redundancy verification application 266 determines whether the identifiers indicate that both adaptors 203 are coupled to the same power source 126. This may be done by making a determination as to whether the power source identifiers received by the respective power redundancy verification system 206 are the same. If not, then the power redundancy verification application 266 ends. Otherwise power redundancy verification application 266 proceeds to box 289 in order to trigger an appropriate alarm as described above. Thereafter, the power redundancy verification application 266 ends as shown.

Figure 7:
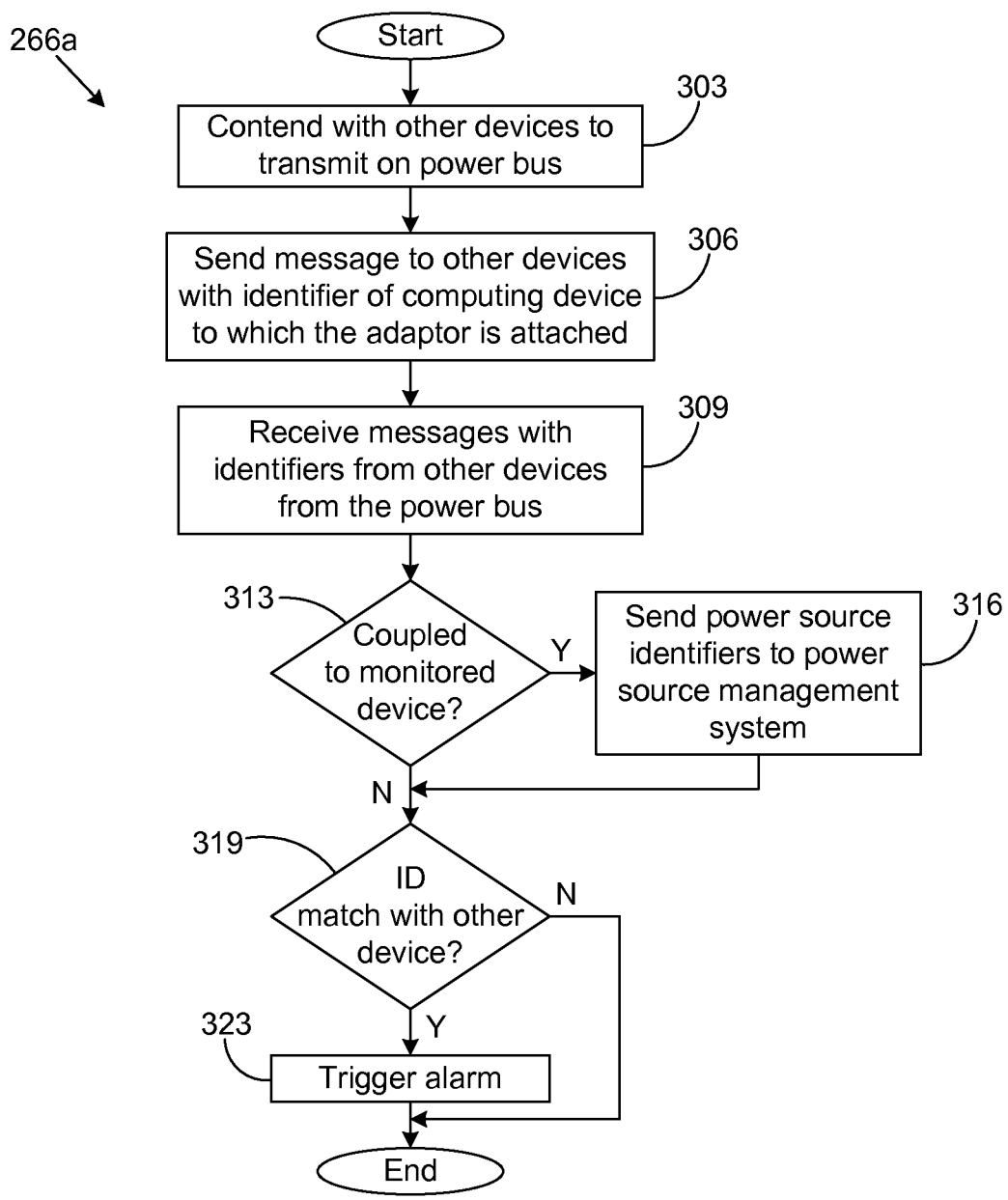
FIG. 7 is a flowchart illustrating another example of functionality of a power redundancy verification application implemented in the system of FIG. 5 according to various embodiments of the present disclosure.

Referring next to FIG. 7, shown is a flowchart that provides another example of the operation of the power redundancy verification application 266, denoted herein as power redundancy verification application 266a, as part of the power redundancy verification system 206 (FIG. 5) according to various embodiments. It is understood that the flowchart of FIG. 7 provides merely an example of the many different types of functional arrangements that may be employed to implement the operation of the portion of the power redundancy verification application 266a as described herein. As an alternative, the flowchart of FIG. 7 may be viewed as depicting an example of steps of a method implemented in the power redundancy verification system 206 according to one or more embodiments.

The power redundancy verification application 266a provides an alternative operation to the power redundancy verification application 266. The power redundancy verification application 266a does not make use of a data connection between the respective power redundancy verification systems 206, where such a connection may be ignored with respect to the following discussion.

The power redundancy verification application 266a operates very differently than the power redundancy verification application 266 (FIG. 6). In particular, in the case of the power redundancy verification application 266a, the power sources 126 (FIG. 4) are not configured to transmit power source identifiers on top of the power signal supplied to the respective computing device 200 (FIG. 4), as described above. Rather, it is assumed that each power source 126 includes a power output bus that is ultimately coupled to the power inputs 123 (FIG. 4) of multiple computing devices 200 through respective adaptors 203 as described in FIG. 4.

By virtue of the fact that multiple power inputs 123 are coupled to a single power bus of a respective power source 126, the power redundancy verification application 266a in each of the adaptors 203 may transmit a data signal onto the power bus to all of the other adaptors 203 through the power lines 133 (FIG. 4) and the respective power bus in a given power source 126. Appropriate filtering may be employed to prevent such data signals from backing through the circuitry coupled to the power busses in the respective power sources 126 themselves. In this respect, each of the power redundancy verification applications 266a communicate with all of the other adaptors 203 coupled to a given power source 126 to determine whether any two or more adaptors 203 coupled to the same computing device 200 are also coupled to the same power source 126 as will be described.

Referring to the flowchart of FIG. 7, to begin, the power redundancy verification application 266a contends with other adaptors 203 coupled to the same power output bus of a single power source 126 to transmit on the power bus. In this respect, any appropriate data contention scheme may be employed to prevent any two of the power redundancy verification applications 266a from transmitting at the same time and causing a data collision as can be appreciated. In box 306, having obtained the right to transmit in box 303, power redundancy verification application 266a sends a message to the other adaptors 203 that includes an identifier of the computing device 200 to which the current adaptor 203 in which the power redundancy verification application 266a is executed is attached. In this respect, the power redundancy verification application 266a may provide for the input of such an identifier so that the power redundancy verification application 266a knows which computing device 200 to which it is coupled.

Thereafter, in box 309, the power redundancy verification application 266a waits to receive messages with identifiers from all of the other adaptors 203 coupled to the respective power bus of the respective one of the power sources 126. Next, the power redundancy verification application 266a determines, in box 313, whether it is coupled to the computing device 200 through a respective data communication interface 159 (FIG. 4) as described above. If so, then in box 313 the power redundancy verification application 266a proceeds to 316. Otherwise, the power redundancy verification application 266a proceeds to box 319.

In box 316, the power redundancy verification application 266a communicates the power source identifiers received to a power management application 233 (FIG. 4) so that various power management functions may be performed, as described above. Thereafter, the power redundancy verification application 266a proceeds to box 319.

Assuming that the power redundancy verification application 266 has progressed to box 319, then it is determined whether the identifier entered into the respective power redundancy verification system 206 of the current adaptor 203 matches any of the identifiers received from any other adaptor 203 coupled to the same power source 126. If not, then the power redundancy verification application 266a ends as shown. Otherwise, the power redundancy verification application 266a proceeds to box 323 to trigger an appropriate alarm as described above. Thereafter, the power redundancy verification application 266a ends as shown. Thus, if two or more adaptors 203 are coupled to the same computing device 200 and presumably the same identifier associated with such computing device 200 was entered or otherwise input into such adaptors 203, then one of the identifiers received from one of the other adaptors 203 should match the entered identifier.

Figure 8:
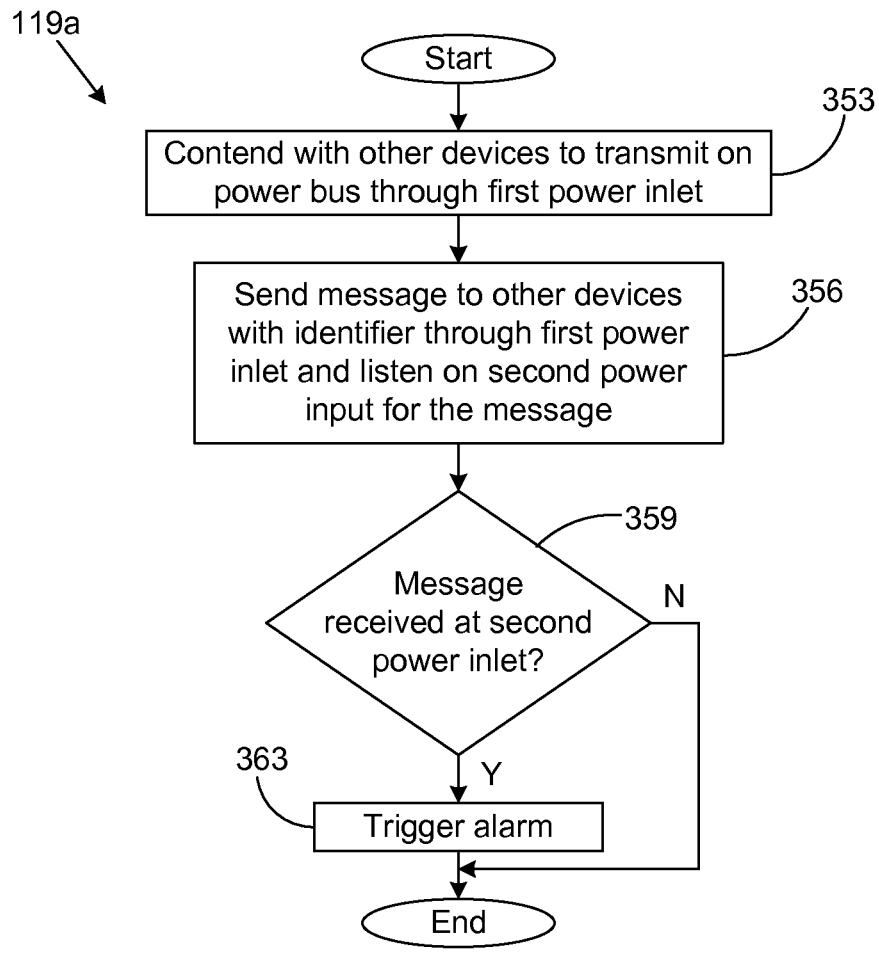
FIG. 8 is a flowchart that illustrates another example of functionality of a power redundancy verification implemented in the computing device of FIG. 1 according to various embodiments of the present disclosure.

Referring next to FIG. 8, shown is a flowchart that provides another example of the operation of the power redundancy verification application 119, denoted herein as power redundancy verification application 119a, in the computing device 100 (FIG. 1) according to various embodiments. It is understood that the flowchart of FIG. 8 provides merely an example of the many different types of functional arrangements that may be employed to implement the operation of the portion of the power redundancy verification application 119a as described herein. As an alternative, the flowchart of FIG. 7 may be viewed as depicting an example of steps of a method implemented in the computing device 100 according to one or more embodiments.

The power redundancy verification application 119a may be implemented, for example, in the configuration as described with respect to FIG. 1 as mentioned above. Alternatively, where the data communication circuits 156 (FIG. 2) include appropriate functionality as described herein, then the logic to be described with respect to the flowchart of FIG. 8 may apply to the power redundancy verification application 119, as described with reference to FIG. 2.

The power redundancy verification application 119a operates upon the principle that each of the computing devices 100 includes the capability of transmitting back on to the power lines 133 (FIG. 1) to a power output bus in a given power source 126 (FIG. 1), as was described with reference to FIG. 7 above. In this respect, the determination as to whether the same power source 126 is coupled to the power inputs 123 of a single contained device 100/150 is determined by facilitating communication between the power communication interfaces 136 of respective computing devices 100 through the power bus of a power source 126, or the data communication circuits 156 in adaptors 153 (FIG. 2) as described above.

To begin, in box 353, the respective power redundancy verification application 119a contends with other computing devices 100 to transmit on a power bus through a first one of the power inputs 123. In this respect, the power communication interface 136 or a respective one of the data communication circuits 156 includes the capability of contending with other devices on a given power bus in order to transmit and avoid a data collision, as described above. To this end, if the configuration of FIG. 2 is employed, then the data communication interface 159 (FIG. 2) would include the capability of sending signals from the computing device 150 to the respective data communication circuit 156 in order to facilitate the operation as described herein. Assuming that the respective power redundancy verification application 119a has gained the right to transmit on the power bus, then in box 356, the power redundancy verification application 119a transmits a message to the other computing devices 100 through the first power input 123. Such message would include an identifier associated with the respective computing device 100/150. In the case of FIG. 2, the power redundancy verification application 119a may provide the identifier to a respective data communication circuit 156 directing the same to transmit the identifier onto the power bus to other adaptors as can be appreciated.

At the same time, the power redundancy verification application 119a listens on the second power input 123 for the same message with the identifier to be received. To this end, the power communication interface 136 and/or the data communication circuit 156 include circuitry that facilitates listening on the second power input 123 for a data signal. In box 359, the power redundancy verification application 119a determines whether the same message with the identifier is received at the second power input 123. If not, then the power redundancy verification application 119a ends as shown. Otherwise, the power redundancy verification application 119a proceeds to box 363 to trigger an alarm. This is because the fact that the message is received at the second power inlet 123 is an indication that both power inlets 123 are coupled to the same power bus, thereby indicating that the power inputs 123 of the respective computing device 100 are coupled to a single power source 126, thereby defeating the desire for power redundancy. Thereafter, the power redundancy verification application 119 ends as shown.

Where any component discussed herein such as the power redundancy verification applications 119, 119a, 266, and 266a is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memories 106, 256 and are executable by the respective processors 103, 253. In this respect, the term "executable" means a program file that is in a form that can ultimately be run by a respective one of the processors 103, 253. Examples of executable programs may be, for example, a compiled program that can be translated into machine code in a format that can be loaded into a random access portion of a respective one of the memories 106, 256 and run by a respective one of the processors 103, 253, source code that may be expressed in proper format such as object code that is capable of being loaded into a random access portion of a respective one of the memories 106, 256 and executed by a respective one of the processors 103, 253, or source code that may be interpreted by another executable program to generate instructions in a random access portion of a respective one of the memories 106, 256 to be executed by the respective processor 103, 253, etc. An executable program may be stored in any portion or component of a memory 106, 256 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 106, 256 is defined herein as including both volatile and nonvolatile memory and data storage components. Volatile components are those that do not retain data values upon loss of power. Nonvolatile components are those that retain data upon a loss of power. Thus, each of the memories 106, 256 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 103, 253 may represent multiple processors and the memories 106, 256 may represent multiple memories that operate in parallel processing circuits, respectively. In such a case, each of the local interfaces 109, 259 may comprise an appropriate network that facilitates communication between any two of the multiple processors between any processor and any of the memories, or between any two of the memories, etc. Each of the local interfaces 109, 259 may comprise additional systems designed to coordinate this communication, including, for example, performing load balancing. Each processor 103, 253 may be of electrical or of some other available construction.

Although the power redundancy verification applications 119, 119a, 266, 266a and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3, 6, 7, and 8 show the functionality and operation of an implementation of various embodiments of the power redundancy verification applications 119, 119*a*, 266, 266*a* as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 103, 253 in a computer system or other system. The machine code may be converted from the source code, etc. If embodied in hardware, each block may represent a circuit or a number of interconnected circuits to implement the specified logical function(s).

Although the flowcharts of FIGS. 3, 6, 7, and 8 show a specific order of execution, it is understood that the order of execution may differ from that which is depicted. For example, the order of execution of two or more blocks may be scrambled relative to the order shown. Also, two or more blocks shown in succession in FIG. 3, 6, 7, or 8 may be executed concurrently or with partial concurrence. Further, in some embodiments, one or more of the blocks shown in FIGS. 3, 6, 7, and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the power redundancy verification applications 119, 119*a*, 266, 266*a*, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    a plurality of power adaptors;
    each of the power adaptors having a plug for coupling to one of the power inputs of a computing device, the power inputs providing for power source redundancy for the computing device;
    each of the power adaptors having a power receptacle for coupling to one of a plurality of power sources;
    each of the power adaptors having an alarm output;
    a plurality of data communication circuits, each data communication circuit being located in a corresponding one of the power adaptors and each data communication circuit being configured to receive one of a plurality of power source identifiers in a data signal transmitted by one of the power sources and received through the power receptacle;
    each of the data communication circuits further comprising a data communication port to establish a data link therebetween; and
    the data communication circuits further comprising logic to exchange the power source identifiers received through the respective power receptacles and to determine whether the power source identifiers both identify the same one of the power sources.

2. The system of claim 1, wherein each of the data communication circuits is further configured to trigger an alarm in the alarm output of the corresponding power adapter if the power source identifiers both identify the same one of the power sources.

3. The system of claim 1, wherein each of the data communication circuits further comprises a data output port for coupling to the computing device to facilitate transmission of the power source identifiers to the computing device.

4. The system of claim 3, wherein the data output port of only one of the data communication circuits is configured to be coupled to the computing device when the power adaptors are plugged into the power inputs of the computing device.

5. A system, comprising:
    a plurality of power sources;
    a computing device having a plurality of power inputs;
    a circuit that receives a plurality of messages transmitted over a corresponding plurality of power distribution lines from at least one of the power sources, each of the messages including an identifier associated with the at least one of the power sources;
    a power redundancy verification application executable in the computing device, the power redundancy verification application comprising logic that determines whether at least two of the identifiers are associated with a single one of the power sources;
    wherein at least a portion of the circuit is included in a plurality of adaptors, each of the adaptors coupling a respective one of the power distribution lines to a corresponding one of the power inputs; and
    an alarm output associated with each one of the adaptors.

6. The system of claim 5, wherein the power redundancy verification application further comprises logic that triggers an alarm if at least two of the identifiers are associated with the single one of the power sources.

7. The system of claim 5, wherein each of the power distribution lines comprises a power cord.

8. The system of claim 5, wherein the power redundancy verification application further comprises logic that sends the identifiers over a network to a power management application executed on a separate computing device.

9. The system of claim 5, wherein the alarm output further comprises a light source.

10. The system of claim 5, wherein the alarm output further comprises an audible alarm.

11. A method, comprising the steps of:
coupling a plurality of power inputs of a computing device to at least one of a plurality of power sources through a plurality of power lines, each of the power sources being coupled to the power inputs through a respective adaptor having an alarm output; and
determining whether at least two identifiers embodied in at least two data signals transmitted over a corresponding at least two of the power lines are the same, where each of the power lines is coupled to a respective one of the power inputs, and the data signals are transmitted by at least one of the power sources.

12. The method of claim 11, wherein
the step of determining whether the at least two identifiers embodied in the at least two data signals transmitted over the at least two of the power lines are the same is performed by a circuit located in at least one of the adaptors.

13. The method of claim 11, wherein:
each of the adaptors including a data communication circuit configured to receive one of the data signals and to forward a respective one of the identifiers to a power redundancy verification application executable in the computing device; and
the step of determining whether the at least two identifiers embodied in the at least two data signals transmitted over at least two of the power lines are the same is performed by the power redundancy verification application.

14. The method of claim 11, wherein the step of determining whether the at least two identifiers embodied in the at least two data signals transmitted over the corresponding at least two of the power lines are the same is performed by the power redundancy verification application executable in the computing device.

15. The method of claim 11, further comprising the step of triggering the alarm output in at least one of the power adapters if the at least two identifiers are the same.

16. The method of claim 15, wherein the alarm output is selected from a group consisting of a visual alarm, an audible alarm, a messaging alarm, and a flag.

17. A system, comprising:
a plurality of power inputs of a computing device, the power inputs providing for a power source redundancy for the computing device;
a plurality of power adaptors, each of the power adaptors having a plug for coupling to one of the power inputs, a receptacle for coupling to one of a plurality of power sources, and an alarm output;
a plurality of circuits, each circuit being located in a respective one of the power adaptors;
each circuit being configured to:
receive data signals transmitted on a common power bus by a plurality of other circuits; and
determine whether at least two of the power inputs are coupled to a single one of the power sources based at least upon at least one of a plurality of identifiers embodied in the data signals.

18. The system of claim 17, wherein the determination as to whether both of the power adaptors are coupled to a single one of the power sources based at least upon one of the identifiers further comprises logic that determines whether the one of the identifiers received through the receptacles matches a predefined identifier associated with the computing device and stored in the circuit.

19. The system of claim 18, wherein each of the circuits further comprises an interface to input and store the predefined identifier associated with the computing device.

20. The system of claim 18, wherein each of the circuits is further configured to trigger the alarm output in the corresponding adapter if the one of the identifiers matches the stored identifier.

21. The system of claim 18, wherein each of the data communication circuits further comprises a data output port for coupling to the computing device to facilitate transmission of the identifiers to the computing device.

22. The system of claim 17, wherein each of the circuit is further configured to contend with the other circuits to transmit data on the common bus.

23. A system, comprising:
a plurality of power inputs of a computing device, the power inputs providing for a power source redundancy for the computing device;
a plurality of adaptors, each of the adaptors having a plug for coupling to one of the power inputs, a receptacle for coupling to one of a plurality of power sources, and an alarm output;
a power redundancy verification system included in the computing device, the power redundancy verification system being configured to:
transmit a data signal through a first one of the power inputs onto a common power bus associated with a at least one of the power sources, the data signal including an identifier associated with the computing device;
listen for the data signal at the second one of the power inputs; and
initiate a notification that the first and second power inputs are both coupled to the same power source if the first and second power inputs are both coupled to the same power source, the notification comprising triggering the alarm output associated with the adapter corresponding with the first power input and the alarm output associated with the adapter corresponding with the second power input.

24. The system of claim 23, wherein power redundancy verification system is further configured to contend with at least one other computing device to transmit the data signal onto the common power bus.

* * * * *

UNITED STATES PATENT AND TRADEMARK OFFICE
CERTIFICATE OF CORRECTION

| | | |
|---|---|---|
| PATENT NO. | : 8,497,779 B1 | Page 1 of 1 |
| APPLICATION NO. | : 12/940470 | |
| DATED | : July 30, 2013 | |
| INVENTOR(S) | : Ronan C. Waide | |

It is certified that error appears in the above-identified patent and that said Letters Patent is hereby corrected as shown below:

In the Claims:

Column 14, line 25 insert the letter -- s -- at the end of the word "circuit" to read as follows:

-- The system of claim 17, which each of the circuits is --

Signed and Sealed this
Eighth Day of July, 2014

Michelle K. Lee
*Deputy Director of the United States Patent and Trademark Office*